(12) United States Patent
Dunleavy et al.

(10) Patent No.: US 9,321,537 B2
(45) Date of Patent: Apr. 26, 2016

(54) BEAM FOR SUSPENDING A TURBOSHAFT ENGINE FROM AN AIRCRAFT STRUCTURE

(75) Inventors: Patrick Dunleavy, Palaiseau (FR); Guillaume Lefort, Annecy (FR); Richard Masson, Les Loges en Josas (FR); Thibaut Francois Roux, Acigne (FR); Guilhem Seize, Cachan (FR)

(73) Assignee: SNECMA, Paris (FR)

( * ) Notice: Subject to any disclaimer, the term of this patent is extended or adjusted under 35 U.S.C. 154(b) by 1124 days.

(21) Appl. No.: 13/387,534

(22) PCT Filed: Jul. 27, 2010

(86) PCT No.: PCT/EP2010/060856
§ 371 (c)(1),
(2), (4) Date: Jan. 27, 2012

(87) PCT Pub. No.: WO2011/012603
PCT Pub. Date: Feb. 3, 2011

(65) Prior Publication Data
US 2012/0119056 A1 May 17, 2012

(30) Foreign Application Priority Data

Jul. 28, 2009 (FR) .................................... 09 03696
Jul. 28, 2009 (FR) .................................... 09 03697
Nov. 17, 2009 (FR) .................................... 09 58124

(51) Int. Cl.
*B64D 27/26* (2006.01)
*C22C 47/04* (2006.01)
*C22C 47/06* (2006.01)
(Continued)

(52) U.S. Cl.
CPC ................ *B64D 27/26* (2013.01); *C22C 47/04* (2013.01); *C22C 47/062* (2013.01); *C22C 47/20* (2013.01); *C22C 49/11* (2013.01); *Y02T 50/44* (2013.01)

(58) Field of Classification Search
CPC ......................... B64D 27/26; B64D 2027/266
USPC ........................ 244/54; 60/796; 248/554, 555
See application file for complete search history.

(56) References Cited

U.S. PATENT DOCUMENTS

| 2,753,140 A | 7/1956 | Hasbrouck et al. |
| 3,222,017 A | 12/1965 | Bobo |
| 5,501,906 A | 3/1996 | Deve |

(Continued)

FOREIGN PATENT DOCUMENTS

| EP | 0 747 573 | 12/1996 |
| EP | 1 593 596 | 11/2005 |

(Continued)

OTHER PUBLICATIONS

International Search Report Issued Jan. 28, 2011 in PCT/EP10/60856 Filed Jul. 27, 2010.

*Primary Examiner* — Christopher P Ellis
*Assistant Examiner* — Magdalena Topolski
(74) *Attorney, Agent, or Firm* — Oblon, McClelland, Maier & Neustadt, L.L.P.

(57) ABSTRACT

A beam for suspending a turboshaft engine from an aircraft structure, including a first attachment mechanism configured to be secured to the aircraft structure and at least one second attachment mechanism configured to be secured to the engine. The beam is at least partially made from a metal-matrix composite material including reinforcing fibers. In one embodiment, the beam takes a form of a circle arc.

16 Claims, 9 Drawing Sheets

(51) Int. Cl.
*C22C 47/20* (2006.01)
*C22C 49/11* (2006.01)

(56) References Cited

U.S. PATENT DOCUMENTS

| | | |
|---|---|---|
| 5,660,526 A | 8/1997 | Ress, Jr. |
| 5,746,391 A | 5/1998 | Rodgers et al. |
| 6,401,448 B1 | 6/2002 | Manteiga et al. |
| 2002/0031678 A1 | 3/2002 | Ress, Jr. et al. |
| 2006/0000944 A1 | 1/2006 | Dron |
| 2006/0219841 A1 | 10/2006 | Dron et al. |
| 2008/0025844 A1* | 1/2008 | Bayer et al. .................. 416/221 |

FOREIGN PATENT DOCUMENTS

| | | | |
|---|---|---|---|
| EP | 1 707 487 | 10/2006 | |
| GB | 2 013 786 A * | 8/1979 | ............... F02C 7/20 |

* cited by examiner

BEAM FOR SUSPENDING A TURBOSHAFT ENGINE FROM AN AIRCRAFT STRUCTURE

BACKGROUND OF THE INVENTION

1. Field of the Invention

The present invention relates to the field of aeronautical turboshaft engines and is more particularly concerned with the suspending of a turboshaft engine from the structure of an aircraft.

2. Description of the Related Art

In an aircraft, a turboshaft engine such as a turbojet engine may be fixed at various points to the structure of this aircraft. For example, it may be fixed under the wing by means of a pylon which provides the interface between the engine and the aircraft. In general the assembly that performs the suspension function comprises a forward suspension and a rear suspension with attachment points on the engine in two planes perpendicular to the engine axis. The various forces that pass through the two suspensions are distributed between front and rear. The plane of the forward suspension passes through the front hub and what is known as the intermediate casing and the plane of the rear suspension passes through the rear hub and what is known as the exhaust casing.

For example, in the case of under-wing mounting, the forward or rear suspension generally comprises a transverse beam connected by link rods to the engine exhaust casing.

Suspensions are, for example, known from Application FR 2 925 016 in the name of the Applicant Company. The beams form massive elements within the airplane structure because they have to have considerable mechanical strength properties in order to be able to support the engine under the airplane; in the prior art, they have generally been made of metal alloys such as Inconel 718®. They also, because of their considerable volume, have a deciding influence on the main cross section of the nacelle that surrounds the engine.

BRIEF SUMMARY OF THE INVENTION

The present invention seeks to address these disadvantages.

To this end, the invention relates to a beam for suspending a turboshaft engine from the structure of an aircraft, extending overall in a direction and comprising at least one first attachment means designed to be fixed to said aircraft structure and at least one second attachment means designed to be fixed to the engine, characterized in that the beam is made at least in part of metal matrix composite incorporating reinforcing fibers, notably parallel to the direction.

Metal matrix composites are known per se for the creation of elongate components operating in compression/tension, such as connecting rods or components of axisymmetric shape. They have the advantage of allowing components to be produced that have excellent mechanical properties when made to work in compression or tension in the same direction as the orientation of the fibers, at a lower mass than the metal alloys intended for the same applications. Such a material is suitable for the aeronautical field, in particular, where there is a constant desire to optimize component strength for minimal mass and size.

The components comprise a metal matrix composite insert, it being possible incidentally for the components to be monolithic. Such a composite is formed of a metal alloy matrix, for example of titanium Ti alloy, within which reinforcing fibers, for example ceramic fibers made of silicon carbide SiC, extend.

Such fibers have a tensile strength which is far superior to that of titanium (typically 4000 MPa as opposed to 1000 MPa). It is therefore the fibers that react the force, the metal alloy matrix acting as a binder to the remainder of the component, and also serving to protect and insulate the fibers which should not come into contact with each other. Further, the ceramic fibers are resistant to erosion, but do need to be reinforced with metal.

Thus, the invention has consisted in using a new material for this suspension application and in recognizing that it was possible to shape the beam appropriately. In particular, insofar as the beam has to operate in tension and in bending, it is possible to shape it so that it does not display the mass and size disadvantages reported hereinabove.

According to a first embodiment of the invention, and in order best to react the forces generated by the engine, particularly the torque, it is desirable for the attachment points via which the engine is attached to the beam to make an angle of between 20 and 90° with the vertical. More specifically this is the angle defined between the median plane of the pylon and the radial plane passing through the axis of the engine and through the axis of one of the clevises on the beam to which clevises the engine is fixed. The fixing points on the engine will thus be as low down as possible to ensure a stable connection. Such an arrangement allows the forces to be distributed optimally along the engine casings.

The length of the beam is, however, limited by the increase in weight that this entails, and that desirably needs to be low, and is also limited by the increase in size which leads to an increase in the main cross-section, which is something that is not desirable either.

Further, the materials used in the prior art do not allow the beams to be lengthened transversely, nor do they allow the creation of attachment points that subtend such a great angle. As mentioned above, the metal alloys used have a high density. It therefore follows that moving the attachment points further away from the central fixing to the pylon amounts to increasing the mass of the suspension significantly. Further, the mechanical properties of these materials mean that the shapes that have to be adopted are very penalizing in terms of size; a consequence of this is the need to increase the volume and especially the main cross section of the nacelle surrounding the engine if the beam is intended for the forward suspension at the intermediate casing; a further consequence is impaired flow of the gasses through the engine if the beam is intended for the mounting of the exhaust casing.

One objective that the Applicant Company has set itself is thus a beam that allows an optimum layout of the attachment points without having any negative impact either on the mass of the suspension or on the size thereof. More particularly, the transverse beam needs to comprise a means of attachment to the pylon and be extended transversely with respect to the axis of the engine by two arms the length of which needs to allow the link rods to be attached as far away as possible from the median plane of the pylon so that these link rods are fixed to the engine casing as low down as possible.

According to the invention, the beam is of elongate shape and more particularly in the shape of an arc of a circle, and the two second attachment means are arranged at the ends of the beam. It is thus possible to choose a very obtuse angle formed by the attachment points, to suit the requirements. In particular, the beam between its ends extends over an arc of a circle subtending between 40° and 180°.

The first attachment means is preferably arranged in the middle and equal distances from the two second attachment means. Such an arrangement is suited to a setup with a symmetrical distribution of the forces.

The invention according to this first embodiment thus has the advantage of reducing the mass of the suspensions by around 30 to 50% as compared with the prior art, while at the same time allowing better reaction of the forces originating from the engine and without any negative impact on the main cross section of the nacelle. Because of the monolithic nature of the component, maintenance thereof becomes easier. The beam comprises reinforcing fibers which run between two attachment means. In particular, the fibers run from one second attachment means to the other second attachment means, with no interruption in the fibers.

The first attachment means more particularly comprises a mounting plate designed to accept fixing means, such as screws. The mounting plate can thus be fixed, for example, directly to the aircraft pylon in the case of an under-wing mounting. The mounting plate is notably in the form of a metal block with housings for the means of fixing to the structure of the aircraft arranged on each side of the fibers of the beam. The mounting plate can be manufactured in such a way as to form a single block with the beam or alternatively so as to be attached to the beam by any suitable means.

The mounting plate may be provided with at least one clevis forming a third attachment means. Such an attachment means is suitable for transmitting forces associated with torque. For preference, the clevis is oriented in such a way that the forces are transmitted to the fibers of the beam tangentially or substantially tangentially thereby limiting the stresses experienced by the clevis. The clevis is thus preferably oriented at an angle of between 50 and 80° with respect to the plane of the mounting plate.

The second attachment means advantageously comprise clevises. The connecting means, such as link rods, are mounted, via members that are generally able to swivel, by one end on these clevises and by the other end on the engine casing, either directly or via an intermediate component, forming what is commonly known as a yoke.

According to a second embodiment of the invention, the beam is in the shape of a ring, said ring being designed to encircle the turboshaft engine and being made at least in part out of metal matrix composite. The reinforcing fibers in the ring are preferably arranged in rings concentric with said ring.

In this embodiment also, the first attachment means advantageously comprises a mounting plate designed to accept fixing means such as screws. The mounting plate can thus be fixed, for example, directly to the pylon of the aircraft in the case of an under-wing mounting.

More particularly, the mounting plate is in the form of a metal block with housings for means of fixing to the structure of the aircraft which are arranged on each side of the fibers of the beam.

The mounting plate may also be provided with at least one clevis forming an additional attachment means, for example for a standby connection that becomes active when the second attachment means fail.

The second attachment means may be distributed about the periphery of the ring; more specifically, the second attachment means distributed about the periphery of the ring are formed of clevises. The clevises are secured to the ring thereby for example forming a system which is monoblock with the ring or alternatively are attached to the ring.

Connecting means, such as link rods, are mounted by one end on these clevises, by members generally in the form of ball swivels and said to be swivel joints, and by the other end to the engine casing either directly or via an intermediate component.

According to a third embodiment of the invention, the beam for suspending a turboshaft engine from the structure of an aircraft comprises reinforcing fibers that are straight and substantially parallel to the overall direction thereof.

It is of course possible for the beam also to comprise straight fibers running parallel to directions other than said overall direction and/or curved fibers.

The beam is thus optimized for minimum mass and minimum size. In particular, for identical performance, it is possible to provide a beam that is less voluminous than the beams of the prior art, thus reducing the main cross section of the nacelle.

The beam is designed to be fixed either directly to the turboshaft engine and directly to the aircraft, or indirectly to the turboshaft engine via an intermediate component.

According to one preferred embodiment, the fibers do not within the material run in line with an attachment means. What is meant here by within the material run in line with an attachment means is have a point that allows a segment to be plotted perpendicular to the direction of the fibers and passing said point and through a point on the attachment means, said segment being (continuously) contained within the material. That the fibers do not within the material extend in line with an attachment means therefore signifies that the fibers do not exhibit any point that can be the end of a segment running inside the material and that meets the attachment means at right angles to the direction of the fibers. Stated differently again, there is no straight path, perpendicular to the direction of the fibers and completely contained within the material, that allows one fiber to be connected to an attachment means.

Because an attachment means is a point at which the stresses to which the beam is subjected are injected, by not within material extending in line with an attachment means, the fibers are not directly subjected to the shear stresses, perpendicular to the direction of the fibers, that could—through the material—be transmitted to them from the attachment means. In other words, by not, within the material, aligning the fibers in line with the areas at which stresses are injected into the material, the shear loading on the fibers are limited; the shear stresses are thus distributed through the material of the beam and do not directly reach the fibers. Now, as was seen earlier, the fibers are very strong in tension-compression (parallel to their direction) but not in shear (perpendicular to their direction). Their use in a beam is thus further optimized.

For preference, the beam contains reinforcing fibers which extend between two attachment means, with no interruption of the fibers. The forces are thus distributed from one attachment means to another (the fibers nonetheless preferably stopping short so as not to extend in line with these attachment means). The beam is preferably, except for the fibers, of a monolithic nature.

The attachment means comprise at least one housing—for example an orifice—for a fixing means.

According to a preferred embodiment, the beam comprises, by way of first attachment means, at least one mounting plate with orifices for accepting fixing elements such as screws. The mounting plate may, for example, allow the beam to be fixed directly or indirectly to the aircraft pylon in the case of an under-wing mounting.

The mounting plate may be manufactured in such a way as to form a single block with the beam or alternatively so as to be attached to the beam by any suitable means.

According to one particular form of this third embodiment of the invention, with the mounting plate having at least one flat surface for contact with a component of the structure of the aircraft to which it is fixed, the fibers are substantially parallel to said surface.

The beam preferably comprises at least one mounting plate comprising at least one connecting clevis forming a second means of attachment (for example to a connecting rod or to another clevis) with at least one orifice for the passage of a clevis pin. A clevis is particularly suited to transmitting forces connected with torque. The connecting rod may allow the beam to be fixed directly or indirectly to the turboshaft engine.

The beam may comprise an upper mounting plate for fixing to the structure of the aircraft and a lower mounting plate for fixing to the turboshaft engine, the two preferably being formed as one and the same monolithic component.

The beam is preferably formed in a titanium alloy. Use is then made of reinforcing fibers made of silicon carbide. Such a beam is able to achieve a weight saving of 50% over a steel beam.

The fibers are notably arranged in at least one straight bundle of rectangular cross section and the beam comprises a plurality of straight bundles within its volume. In such an instance, depending on the bending forces imposed on the beam and depending on the positioning of the bundles, some bundles may advantageously preferentially react tensile forces while others preferentially react compression forces. Incidentally, it is noted that within one and the same bundle, certain fibers may work predominantly in compression and others in tension.

The suspension beam of the invention can be used in any type of suspension, notably for incorporating a turboshaft engine into an aircraft in one of the following positions: under the wing, on the wing, with the nacelle incorporated into the wing, on the fuselage or on the empennage.

BRIEF DESCRIPTION OF THE SEVERAL VIEWS OF THE DRAWINGS

Non-limiting embodiments of the invention are now described by way of illustration with reference to the drawings in which.

DETAILED DESCRIPTION OF THE INVENTION

Figure 1:
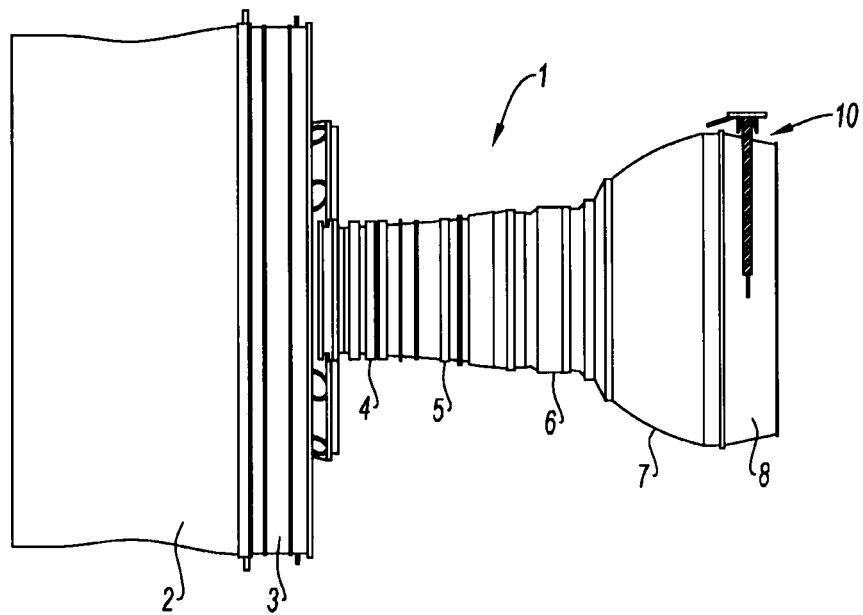
FIG. 1 depicts, in a side view, a forward fan turbofan engine provided with a suspension beam mounted on the exhaust casing according to a first embodiment of the invention.

FIG. 1 depicts the general outline of a bypass turbojet engine 1. From left to right, can be seen the fan casing 2 and the intermediate casing 3. Of the latter only the outer shell ring is visible. It is connected to the hub by radial arms, not visible in the figure, which via suitable bearings support the shafts of the rotors of the rotary assemblies and assemblies that form the low-pressure BP, and high-pressure HP spools for example. Visible in succession across the figure from left to right, and with increasingly small diameters, are the casings of the HP compression stages 4, of the combustion chamber 5, of the HP turbine stages 6, and then, with increasing diameters, of the BP turbine stages 7 downstream of which is the exhaust casing 8 which like the intermediate casing 3 supports a hub on which the downstream rolling bearings of the shafts of the rotors of the rotary assemblies of the machine are mounted.

Figure 2:
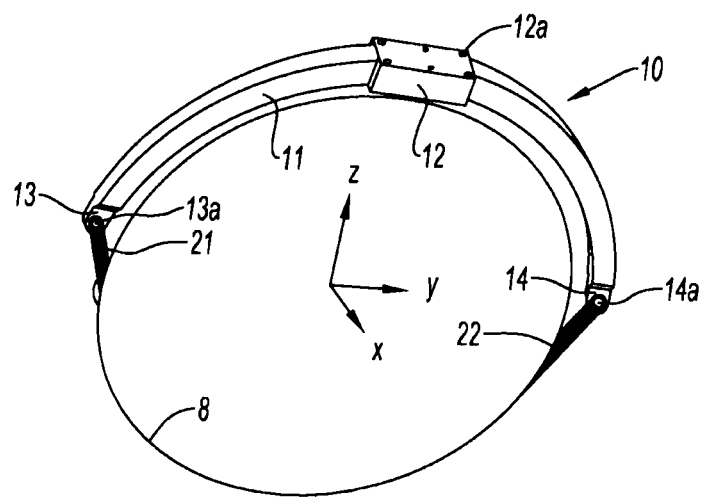
FIG. 2 is a perspective view of a beam according to the first embodiment of the invention, in situ in its environment.

The engine 1 is suspended from the structure of the aircraft it propels and which has not been depicted, by a forward suspension, not depicted here, and by a rear suspension 10. The suspension is shown in situ, in FIG. 2, on the exhaust casing 8 which has been depicted schematically as a circle. The suspension 10 according to the invention comprises a beam 11 made with an insert of metal matrix composite. The beam 11 is of elongated shape with a rectangular cross section and forms an arc of a circle here subtending more or less 180°. The beam is arranged around the upper part of the exhaust casing in the plane (Oy, Oz) perpendicular to the axis of the engine Ox. Oy indicates the transverse axis and Oz the vertical axis.

A first attachment means is formed of a mounting plate secured to the beam between the two ends thereof.

The mounting plate 12 is formed of a metal block with one face in the plane (Ox, Oy) for mounting fixed to a pylon, not depicted. The mounting plate is fixed to the pylon for example by screws arranged in housings 12a formed on the mounting plate on each side of the median line of the beam. The mounting plate may as appropriate have housings 12b for shear pins, in the known fashion.

Second attachment means are formed of clevises 13 and respectively, which are secured to the beam 11 at each of its ends. The clevises, which may be single or double, have an orifice the axis of which is parallel to the engine axis Ox, for mounting the end of a link rod 21, 22 respectively. In as much as the link rods work in tension/compression, mounting is of the pivoting type, as known in the art. The forces transmitted between the clevises and the link rods are thus exclusively oriented in the lengthwise direction of the link rods. The other end of the link rods is fixed to a flange of the exhaust casing 8 by a setup which is likewise of the pivoting type. In the arrangement depicted, the second attachments are more or less diametrically opposite and the link rods are mounted on the casing in a low down position in the plane (Ox, Oy) that passes through the axis of the engine, allowing the forces to be reacted in a way that is optimized for certain attachment configurations.

This geometry of the suspension beam is rendered possible by the presence of reinforcing fibers such as fibers of silicon carbide within its structure.

Figure 3:
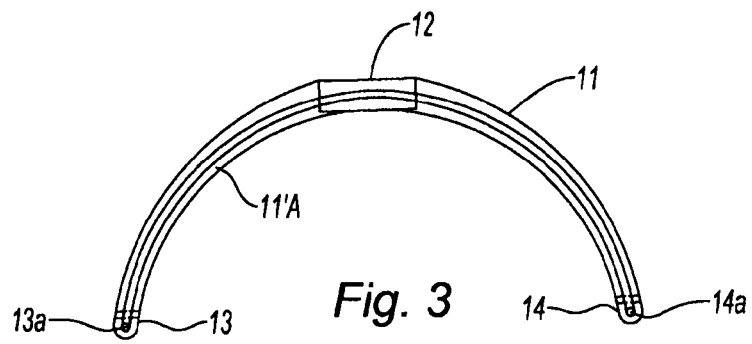
FIG. 3 is a view showing hidden detail of the arrangement of the reinforcing fibers within the beam of FIG. 2.

FIG. 3 shows, with hidden detail, a first example of an arrangement of reinforcing fibers. The fibers 11'A visible run in the lengthwise direction of the beam parallel to the walls thereof and make loops connecting one second attachment means 13 to the other 14. The loops run around the orifices 13a and 14a for the fixing of the link rods.

Figure 4:
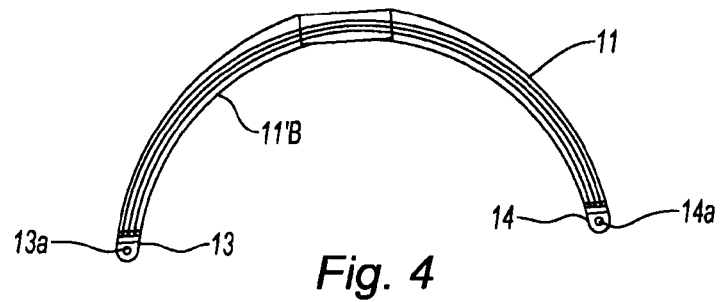
FIG. 4 shows a different layout, compared with FIG. 3, of the reinforcing fibers inside the beam.

FIG. 4 shows another example of the layout of the fibers. The fibers 11'B form strands, in this instance three strands, in an arc of a circle extending from one attachment means to the other. Unlike in the previous embodiment, the strands are cut near the second attachment means.

Arranging the reinforcing fibers in the longitudinal direction gives the beam very high strength along the path of the forces between the first attachment means and the second attachment means.

Figure 5:
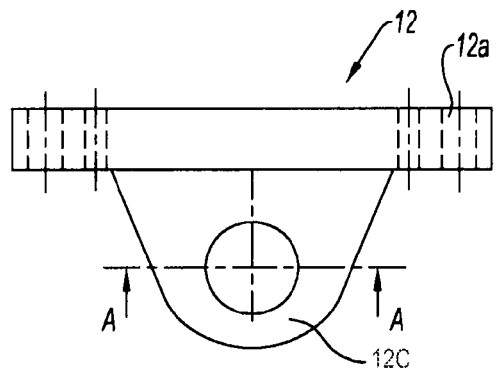
FIG. 5 is a side view of one embodiment of the first means of attachment to the structure of the aircraft for the first embodiment of the invention.
Figure 6:
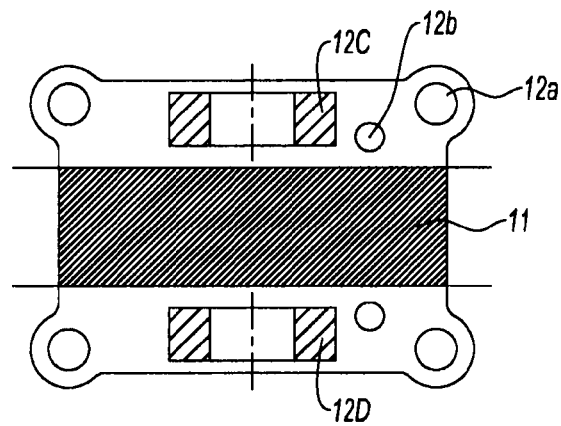
FIG. 6 is a view in section on AA of the first attachment means of FIG. 5.

One embodiment of the first attachment means 12 has been depicted in greater detail in FIGS. 5 and 6. The mounting plate 12 of the attachment means extends, crosswise, on each side of the bundle of reinforcing fibers. This arrangement allows the housings 12a for the fixing members to be created outside of the bundle of fibers so as not to weaken them.

If appropriate, a third attachment means is provided, in this instance formed of the two clevises 12C and 12D pierced with an orifice the axis of which runs parallel to the axis of the engine, for fixing link rods connected to the casing and through which the forces connected with torque pass. The clevises are depicted, schematically in this instance, at right angles to the mounting plate but they are preferably oriented so that the torque forces passing through them are tangential.

Figure 7:
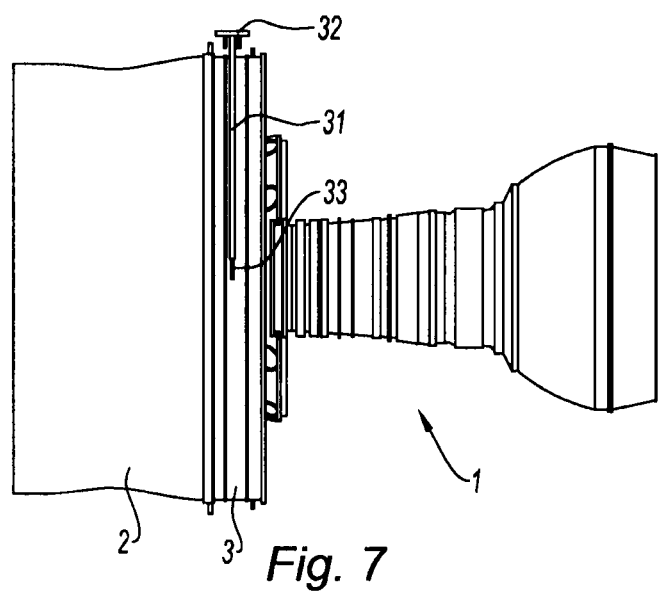
FIGS. 7-9 show another application of the beam according to the first embodiment of the invention.
Figure 8:
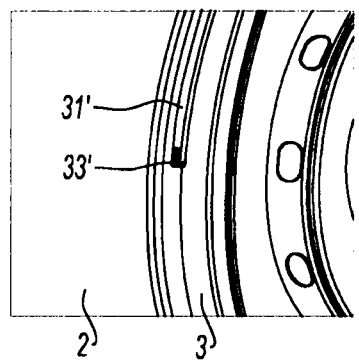
Figure 9:
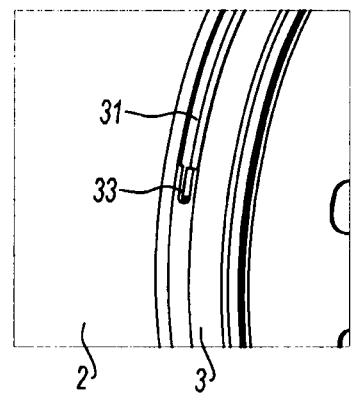
Figure 10:
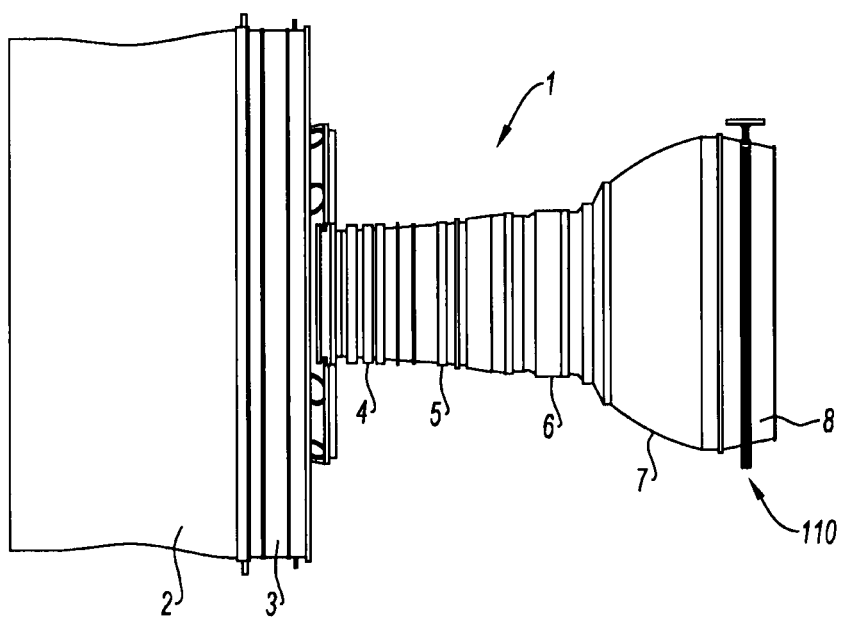
FIG. 10 is a side view of a forward fan turbofan engine provided with a suspension beam according to a second embodiment of the invention, mounted on the exhaust casing.

FIGS. 7-9 depict another way of suspending the engine. In this embodiment, the beam 31 or 31', which corresponds to the beam 11 of the previous embodiment and is produced in the same way, is mounted on the intermediate casing 3 of a multiple-flow turbojet engine. The beam 31 comprises a first attachment means 32 between two second attachment means 33. The first means is formed of a mounting plate comprising housings for the passage of screws for fixing to the pylon of an aircraft in the case of an under-wing mounting. The two second attachment means 33 are formed of single clevises, referenced 33 in FIG. 9, or double clevises, referenced 33' in FIG. 8, for connection to the intermediate casing, either directly to flanges provided for that purpose on the external shell ring thereof, or via link rods. These means are not depicted in FIGS. 7-9. It will be noted that the beam 31, 31' is thin enough that it is possible to conceive of housing it between the transverse flanges of the shell ring extending radially outward.

Application of the beam according to the invention is not restricted to the engine being mounted under the wing. It will be appreciated that it can be used for all the other types of mounting in which it is able to work in tension/compression and in bending.

A second embodiment of the invention is depicted in FIGS. 10 to 15.

The engine 1 is suspended from the structure of the aircraft that it propels and which has not been depicted, by a forward suspension, not depicted here, and by a rear suspension 110. The suspension is shown in situ, in FIG. 11, on the exhaust casing 8 which has been depicted schematically by a circle. The suspension 110, according to the embodiment of the invention, comprises a beam 111 made of metal matrix composite. The beam 111 makes a 360° ring. The beam is arranged around the exhaust casing in the plane (Oy, Oz) perpendicular to the axis of the engine Ox. Oy indicates the transverse direction and Oz the vertical direction.

A first attachment means is formed on a mounting plate 112 secured to the beam. The mounting plate 112 is formed of a metal block with one face in the plane (Ox, Oy) for fixed mounting to a pylon, not depicted. The plate is fixed to the pylon, for example by screws arranged in housings 112a formed on the mounting plate on each side of the beam 111 and of the region through which the reinforcing fibers pass. The mounting plate may, as appropriate, comprise housings for shear pins, in the known fashion.

Figure 11:
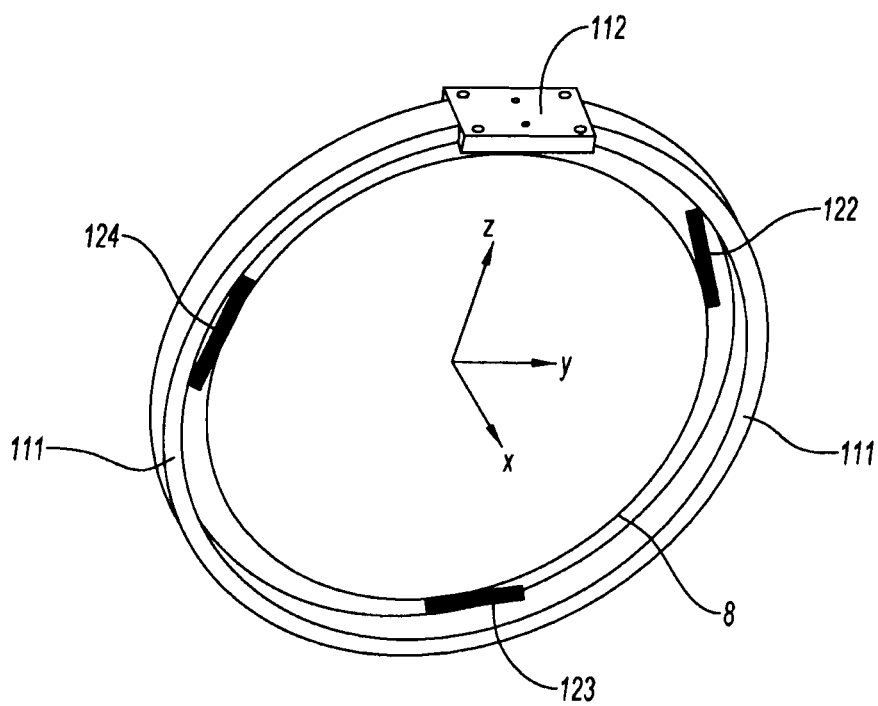
FIG. 11 shows a beam according to this second embodiment of the invention, depicted in perspective, in situ in its environment.
Figure 15:
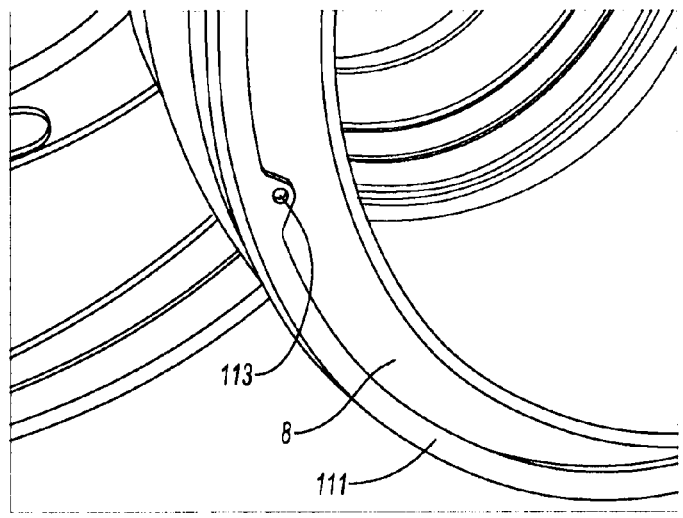
FIG. 15 is a schematic depiction of a second means of attachment.

Second attachment means are formed by devises 113, one of which has been depicted in situ in FIG. 15, which are secured to the beam 111. The devises, which may be single or double devises, comprise an orifice of axis parallel to the engine axis Ox, for mounting the end of a link rod, 122, 123, or 124. FIG. 11 schematically depicts three link rods distributed about the periphery of the ring. These link rods are oriented in such a way as to optimize the injection of force into the ring so that the fibers work mainly in tension/compression or in bending. The link rods are substantially tangential to the curve of the ring. The link rods are mounted on the ring in a pivoting fashion, as is known in the art. The transmission of force between the devises and the link rods is therefore exclusively oriented in the lengthwise direction of the link rods. The other end of the link rods is fixed to a flange of the exhaust casing 8 by a mounting of pivoting type also. The connections between the link rods and the casing and between the link rods and the ring have not been depicted.

This suspension beam geometry is made possible by the presence of reinforcing fibers such as silicon carbide fibers within its structure.

Figure 12:
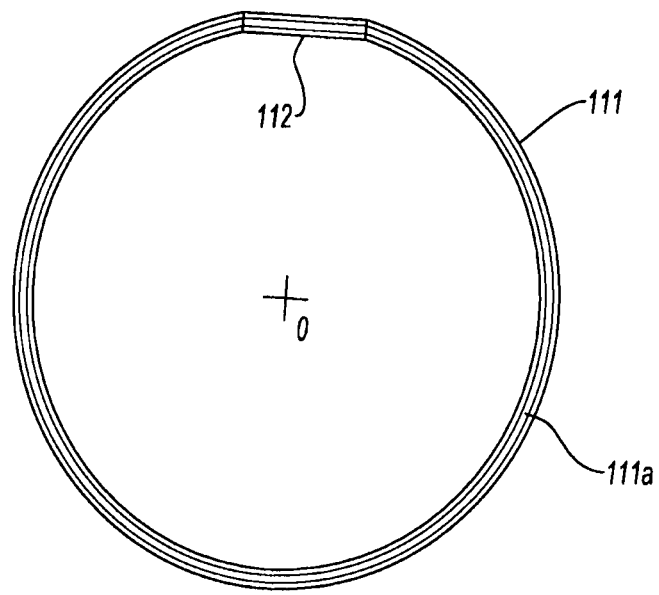
FIG. 12 is a view showing hidden detail of the arrangement of the reinforcing fibers within the beam of FIG. 11.

FIG. 12 shows, with hidden detail, one example of the layout of the reinforcing fibers. The fibers 111a form rings concentric with the ring 111.

Arranging the reinforcing fibers along the ring gives the beam very high strength along the path of the forces between the first attachment means and the second attachment means.

Figure 13:
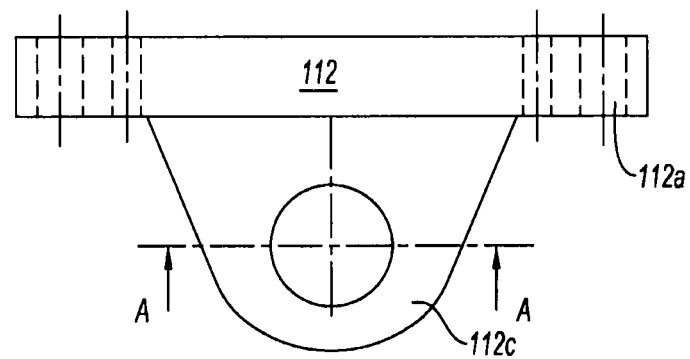
FIG. 13 is a side view of one embodiment of the first means of attachment to the structure of the aircraft of the invention.
Figure 14:
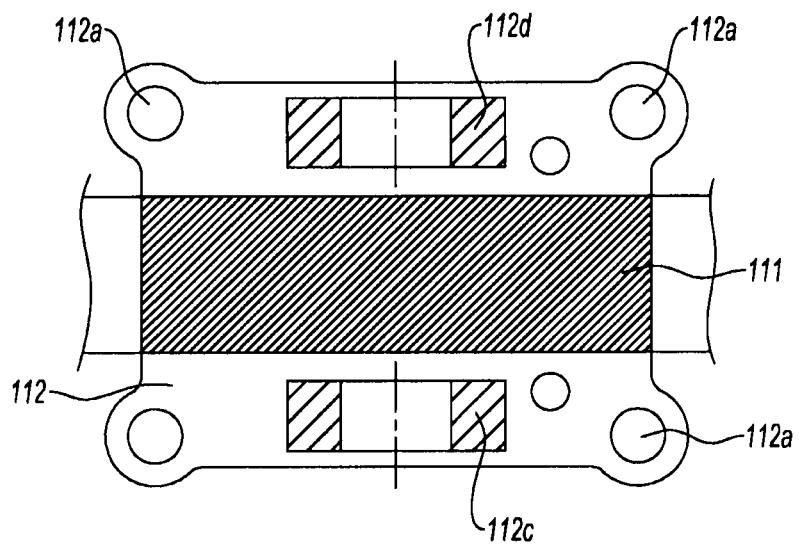
FIG. 14 is a plan view of the first attachment means of FIG. 13.

One embodiment of the first attachment means has been depicted in greater detail in FIGS. 13 and 14. The mounting plate of the attachment means extends, crosswise, on each side of the bundle of reinforcing fibers. This arrangement allows the housings for the fixing members to be created outside of the bundle of fibers so as not to weaken them.

If appropriate, a second attachment means is provided in this instance being formed of the two clevises 112c and 112d which are pierced with a orifice of axis parallel to the axis of the engine for standby fixing for example.

The application of the beam of the invention is not restricted to under-wing mounting. It will be appreciated that it can be used for all the other types of mounting in which it is likely to work in tension/compression and in bending.

A third embodiment of the invention is described hereinbelow with reference to FIGS. 16 to 22.

The engine 1 is suspended from the structure of the aircraft it propels, and which is not depicted, by a forward suspension 209 and by a rear suspension 210. The suspensions 209, 210 are fixed to an engine pylon or strut, not depicted in FIGS. 15 and 16, which is itself secured to the structure of the aircraft.

The forward suspension 209 comprises a beam 211 which is connected by an intermediate component 212 to the external shell ring 3a of the intermediate casing 3. This intermediate component 212 partially espouses the shape of the shell ring and is also known by the name of "yoke".

The rear suspension 210 comprises a beam 213 which is connected by an intermediate component 214 to the external shell ring 8a of the exhaust casing 8.

The beams 211, 213 of the forward 209 and rear 210 suspensions are designed to be fixed to the pylon and thus allow the turbojet engine 1 to be suspended from the aircraft.

Figure 16:
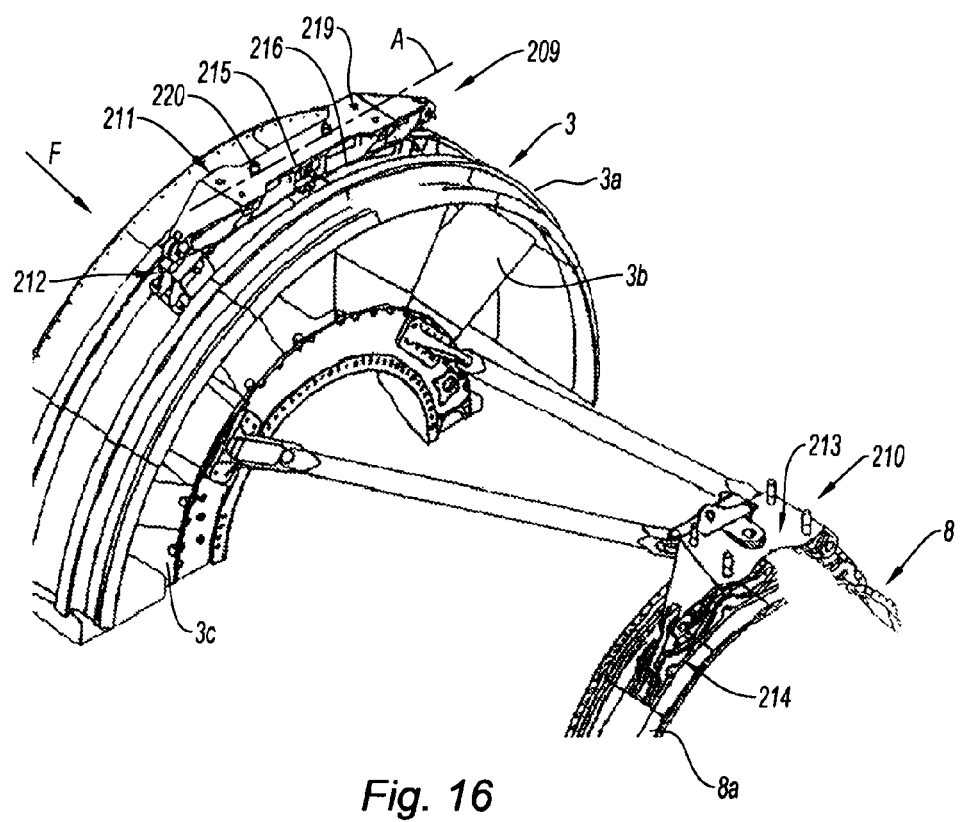
FIG. 16 is a schematic perspective view of a turbojet engine of the type depicted in FIG. 1 provided with a forward beam and with a rear beam according to a third embodiment of the invention.

The first form of this embodiment of the invention will be described in relation to the forward beam 211 of FIGS. 16 and 17. It of course likewise applies to the rear beam 213.

The forward beam 211 extends overall along a straight axis A and is arranged in a plane Oy Oz. It comprises an upper mounting plate 215 and a lower mounting plate 216 each extending generally in a plane parallel to the axis A, in the plane Ox Oy in FIG. 17 which is a horizontal plane. The concepts of upper and lower relate to the respective positions of the elements in FIG. 17—or more generally across all the figures—and are used to make them easier to describe. The mounting plates 215, 216 are connected by a connecting portion 217 perpendicular to the planes of the mounting plates 215, 216, and so in this instance a vertical connecting portion 217 (which may have transverse and/or longitudinal walls, in this instance one longitudinal wall and two transverse walls one on each side of the longitudinal wall). Recesses 218 are formed on each side of this connecting portion 217, to save on material. The connecting portion 217 here is formed as one piece with the upper 215 and lower 216 mounting plates.

The upper mounting plate 215 has a flat upper surface 215a designed to come into contact with a corresponding surface of the pylon at which it is secured thereto. Attachment means 219 fixed to the pylon are formed on the upper mounting plate 215; these are housings 219 and, more specifically, orifices 219 that accept fixing screws that fix the upper mounting plate (and therefore the beam 211) to the pylon. The orifices 219 are each formed near one corner of the upper mounting plate 215. Shear pins 220 are arranged projecting out from the upper surface 215a of the upper mounting plate 215, in the known way.

The beam 211 comprises attachment means 220a, 220b forming second means of attachment—in this instance indirect attachment—to the intermediate casing 3, in this instance clevises 220a, 220b situated on each side of the beam 211 at each of the longitudinal ends thereof. These are double clevises 220a, 220b in this instance. Each clevis 220a, 220b comprises orifices to house a pin that secures it to a connecting rod connected to the intermediate component 212 which is itself fixed to the intermediate casing 3 in a way well known in the art. The mounting between the clevises 220a, 220b and their connecting rod is of the pivoting type, in a way that is also known.

The beam 211 is partially made of metal matrix composite and incorporates reinforcing fibers (depicted schematically with the reference numeral 221) which are straight and substantially parallel (in this instance parallel) to one another and to the overall direction A along which the beam 211 extends. What is meant by straight is an element which does not deviate from one end to the other. As explained above, such straight fibers 221 are very strong in tension and in compression and are thus capable effectively of reacting the bending (and tension and compression) forces to which the beam 211 is subjected.

According to this embodiment, the fibers are grouped into straight bundles or packets of rectangular cross section; these bundles take the form of bars or segments, the ends of the bundles being cut perpendicular to their axis.

The fibers 221 are also arranged so that they do not, within the material, extend in line with one attachment means and, in particular, with an orifice 219 housing a fixing means, whether this be an orifice 219 (in the upper mounting plate 215) for accepting a screw or an orifice (in a clevis 220a, 220b) for accepting a clevis pin. Thus, the shear forces applied to the attachment means 219, 220a, 220b are not transmitted directly to the fibers 221 by the material because these fibers are not, within the material, situated in line with these attachment means 219, 220a, 220b.

The beam 211 comprises two packets of fibers 221 along the upper mounting plate 215, on each side of the median vertical longitudinal plane of the beam 211; these fibers 221 extend uninterrupted from near one end of the mounting plate 215 to the other but are longitudinally interrupted before they reach the orifices 219 that accept the fixing screws, in order not to extend in line therewith. The beam 211 moreover comprises two packets of fibers 221 along the lower mounting plate 216, these packets being symmetric on each side of a transverse vertical median plane of the beam 211, the fibers 221 of each packet extending along a recess 218 of the beam 211 and being interrupted longitudinally before they reach the orifices 219 that accept the fixing screws in order not to extend in line therewith.

The beam 211 is formed of a single monolithic block through which the fibers 221 extend. In other words, the metal from which the (monolithic) beam is formed is the same as the metal that forms the matrix of the MMC that incorporates the reinforcing fibers 221. The fibers 221 are silicon carbide fibers and the metal of which the beam 211 is made is a titanium Ti alloy. Possible ways of manufacturing the beam 211 will be described later.

A second form of a beam according to this embodiment of the invention will be described with reference to FIGS. 18 to 22. This form has, in the eyes of a person skilled in the art, many similarities with the previous embodiment and this is why the references used for the elements of the turbojet engine and of the beam 211 in FIGS. 16 and 17 that have an identical, equivalent, similar or comparable function or structure to those of the elements of the beam of FIGS. 18 to 22 are the same, with only a prime (') symbol to differentiate between them. The description can thus be simplified, the reader understanding that elements followed by a prime symbol, although admittedly different from those of FIGS. 16 and 17, are comparable therewith and perform a similar function. Thus, the beam is not described again in full, the description of each of the embodiments applying to the other, when there is no incompatibility.

Figure 18:
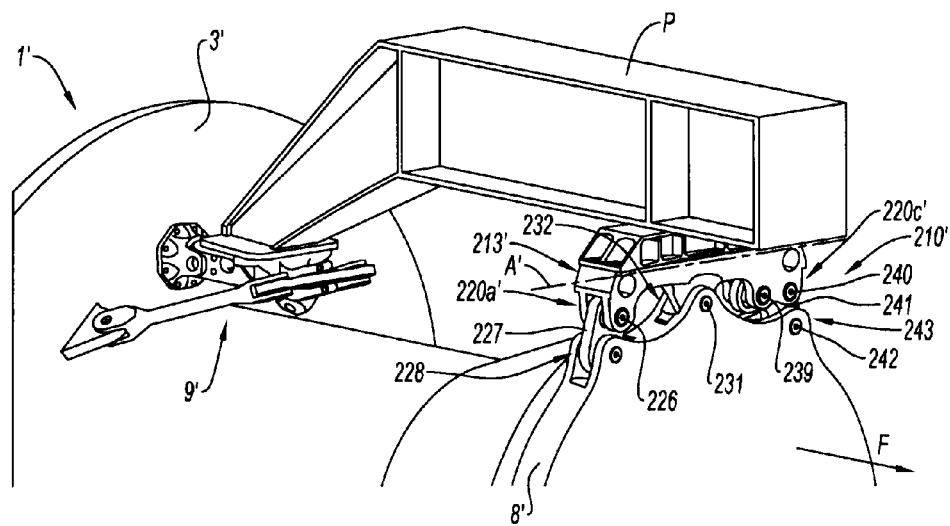
FIG. 18 is a schematic perspective view of a turbojet engine with a rear beam according to another form of the third embodiment of the invention.

The turbojet engine 1' of FIG. 18 comprises, as before, an intermediate casing 3' and an exhaust casing 8', both of them structural. FIG. 18 depicts a pylon P of the aircraft to which the turbojet engine 1' is fixed by a forward suspension 209' and a rear suspension 210'. The forward suspension 209' is of a special type which will not be described in detail here, with a snout housed in a suitable fixing housing of the intermediate casing. The rear suspension 210' comprises a simple beam 213', fixed directly to the exhaust casing 8' with no intermediate component.

The beam 213' extends generally along a straight axis A' and comprises an upper mounting plate 215' and a lower mounting plate 216' each generally extending in a plane which in this instance is horizontal and parallel to the axis A' and which are connected by a perforated vertical longitudinal wall 217' (three orifices 218' are formed in this wall 217').

The upper mounting plate 215' has a flat upper surface 215a' designed to come into contact with a corresponding component of the pylon in the region of which it is fixed thereto. Means 219' of fixed attachment to the pylon are formed on the upper mounting plate 215', in this case housings 219' and more specifically orifices 219' for accepting fixing screws that fix the upper mounting plate 215' (and therefore the beam 213') to the pylon. As before, these orifices 219' are each formed near a corner of the upper mounting plate 215', while shear pins may also be provided.

The beam 213' also comprises attachment means 220a', 220b', 220c' that form a second means of—direct—attachment to the intermediate casing 3', in this instance clevises 220a', 220U, 220c' that extend downward from the lower mounting plate 216'. More specifically, the beam 213' at each of its longitudinal ends comprises a double clevis 220a', 220c', respectively and, in a central position between these clevises, one single clevis 220b'.

Figure 17:
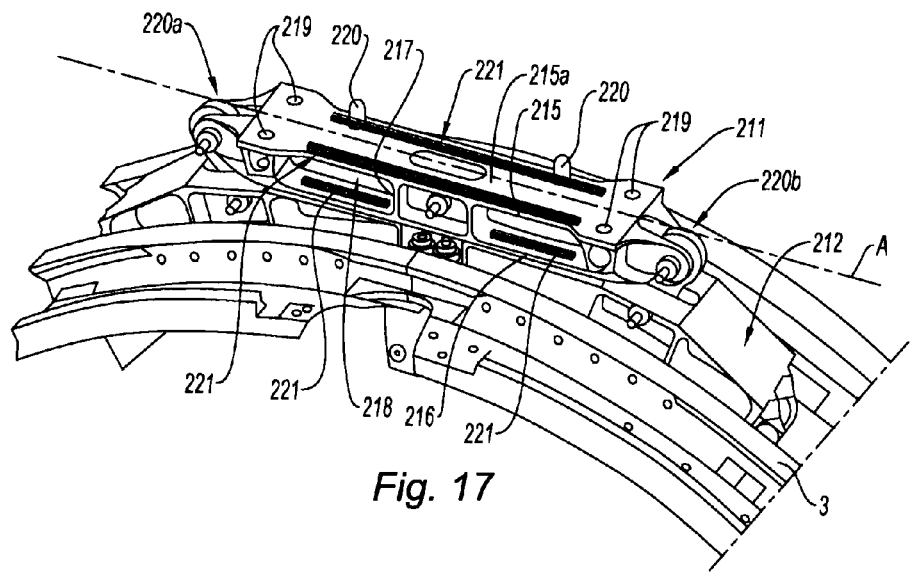
FIG. 17 is an enlarged perspective view of the forward beam of FIG. 16, viewed from the other side as compared with FIG. 16.

The double clevis 220a' situated on the left side of the beam 213' in FIGS. 17 and 18 comprises two laterally opposing lugs 222, 223 one each side of the beam 213', each lug 222, 223 being pierced with a respective orifice 224, 225 for the passage of a clevis pin 226 that articulates a connecting rod 227 connected, at its other end, to a double clevis 228 of the exhaust casing 8' of the turbojet engine; the pin 226 of the clevis 220a' is perpendicular to the overall axis A' of the beam 213' and horizontal. The articulations of the connecting rod 227, both to the clevis 220a' of the beam 213' and to the clevis 228 of the exhaust casing 8', are designed to be pivoting, at least to a certain extent, in order in particular to absorb differential thermal expansions.

The single clevis 220b' situated at the middle of the beam 213' in FIGS. 17 and 18 comprises a single lug 229 in the laterally central position and pierced with an orifice 230 for the passage of a clevis pin 231 that articulates the single clevis 220b' to a double clevis 232 of the exhaust casing 8' (with no intermediate link rod); the pin 231 of the clevis 220b' is perpendicular to the overall axis A' of the beam 213' and horizontal. The articulation of the clevises 220b', 232 is designed to be a pivoting articulation.

Figure 19:
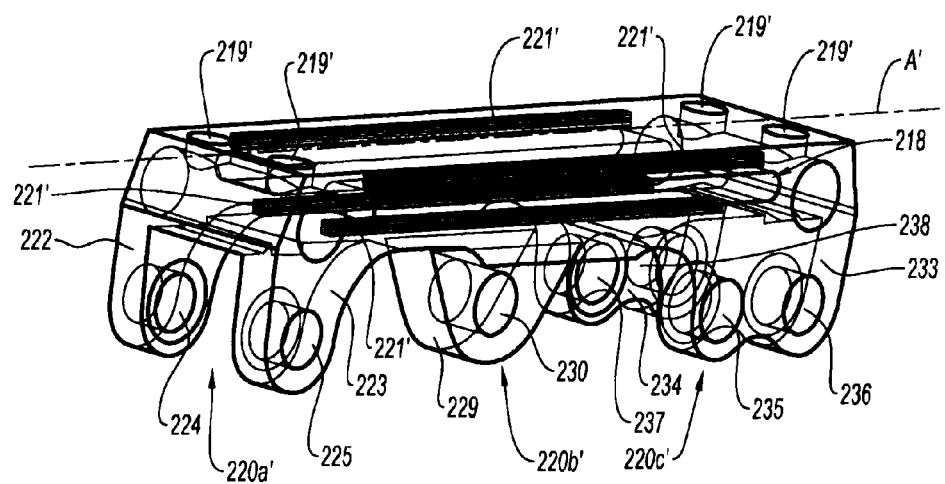
FIG. 19 is a perspective line drawing of the rear beam of FIG. 18.

The double clevis 220c' situated on the right-hand side of the beam 213' in FIGS. 18 and 19 comprises two double lugs 233, 234 each pierced with two parallel orifices (235, 236), (237, 238) respectively. The lugs 233, 234 laterally oppose one another on each side of the beam 213' and their axes (235, 236), (237, 238) are aligned in pairs to house two clevis pins 239, 240 for articulating a connecting rod 241 comprising an end (or head) designed to accept the two pins 239, 240 and another end (or head) through which there passes a pin 242 providing articulation to a double clevis 243 of the exhaust casing 8'. The articulations of the connecting rod 241, both at the clevis 220c' of the beam 213' and at the clevis 243 of the exhaust casing 8', are designed to be pivoting articulations, at least to a certain extent.

The beam 213' is partially made of metal matrix composite and therefore incorporates reinforcing fibers (depicted schematically by the reference 221') which are straight and substantially parallel or parallel to one another and to the overall direction A' along which the beam 213' extends.

The fibers here are grouped into straight bundles or packets of rectangular cross section; these bundles take the form of bars or segments the ends of which are cut perpendicular to their axis. In FIGS. 19 to 22, the fibers 221' have therefore been depicted in the form of straight inserts of parallelepipedal shape; in practice, these are effectively parallelepipedal inserts of MMC that can be used for manufacturing the beam 213'; once the beam 213' has been manufactured, these parallelepipedal shapes in fact make an envelope (in shape) in which the fibers 221' extend, it being understood that once the beam 211 is formed there is in this instance continuity of metal between the fibers 221' and the remainder of the beam 213'. Specifically, as was explained earlier, the beam 213' can be formed by isostatic compression of MMC inserts in a block of metal identical to the metal in the matrix part of the MMC, in this instance a titanium alloy; and once compression is completed, the beam 213' is monolithic in titanium alloy, except for the reinforcing fibers which extend within the beam 213', parallel to its overall axis A'.

It will be noted that the beam 213' is formed in such a way that the fibers 221' do not within the material extend in line with the attachment means 219', 220a', 220b', 220c' and more particularly the orifices 219', 224, 225, 230, 235, 236, 237, 238 of these attachment means 219', 220a', 220b', which form regions in which stress is transmitted to the beam 213'.

The expression explaining that the fibers 221' do not, within the material, lie in line with an orifice, will be understood to mean that it is not possible to plot a segment contained within the material perpendicular to the axis of the fibers 221' (i.e. to the axis A' of the beam 213') and which connects an orifice 219', 224, 225, 230, 235, 236, 237, 238 to a fiber 221'. In particular, it will be noted that fibers 221' could have extended into the upper mounting plate 215' in this instance in line with the clevis 220b' of the lower mounting plate 216', because they would have been separated therefrom by the void formed by the central orifice 218 between the mounting plates 215', 216', thus preventing there being a segment perpendicular to the axis of the fibers 221' and connecting them directly (continuously) within the material to the clevis 220b'.

As can be seen from the figures, the fibers 221' do not (in absolute terms) extend in line with any orifice 219', 224, 225, 230, 235, 236, 237, 238 (i.e. not only are they not within the material in line therewith but also not in line with them at all, even with a void in-between).

Figure 20:
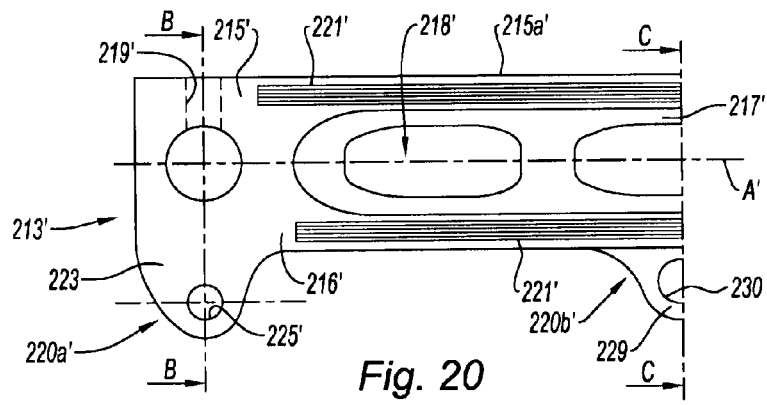
FIG. 20 is a side view of half of the beam of FIG. 19.
Figure 21:
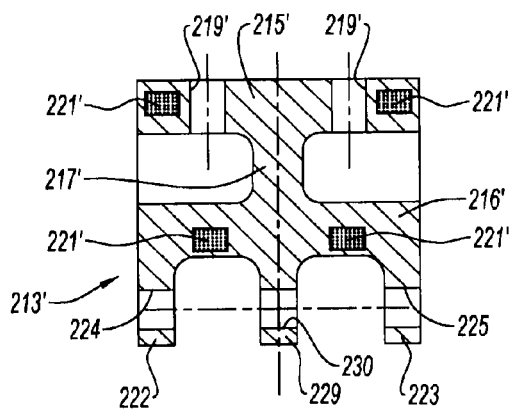
FIG. 21 is a cross section on the plane B-B of FIG. 20 of the beam of FIG. 20.
Figure 22:
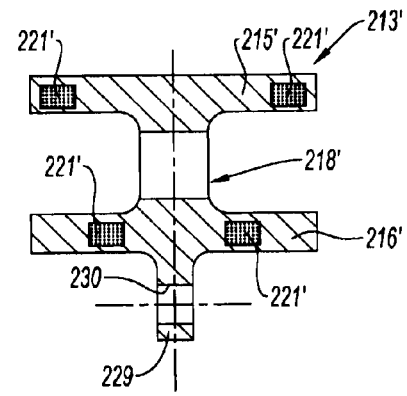
FIG. 22 is a cross section on the plane CC of FIG. 20 of the beam of FIG. 20.

It will be noted that the view in FIG. 20 is not entirely true to life insofar as the fibers 221' do not extend in the plane of section B-B. They have nonetheless been depicted in order to give a spatial depiction of the distribution of the fibers 221' through the beam 213'.

One or other of the beams depicted above can be manufactured using all or some of the teaching of one of the methods set out in the patent applications FR 2,886,290, FR 2,919,283, FR 2,919,284 in the name of the Applicant Company or even FR 2,925,897 and FR 2,925,895 in the name of Messier Dowty.

According to one method of manufacture, a first step involves preparing an insert or a plurality of inserts from metal matrix ceramic filaments. These filaments comprise a ceramic fiber, such as an SiC fiber, coated with metal. They are also known as MMC fibers or coated filaments. The metal provides the elasticity and flexibility which are necessary for handling them.

The manufacture of composite filaments, or coated filaments, can be performed in various ways, for example by electric field assisted chemical vapor deposition, by electrophoresis from a metallic powder or even by coating ceramic fibers by dipping them in a bath of liquid metal. Such a method of coating ceramic fibers by dipping, in a liquid metal, is discussed in patent EP 0 931 846 in the name of the Applicant Company.

The insert is created by assembling coated filaments to form a bundle. The filaments are held together temporarily by adhesive or by wrapping a foil around the bundle. They can also be assembled by winding coated filaments around a mandrel as described for example in patent FR 2,886,290.

The coil or bundle of filaments is then placed in a metal container into which a groove has been machined beforehand to form a housing for the insert. The depth of the groove exceeds the height of the coil. A lid is placed on the container and welded around its periphery once a vacuum has been created. The lid has a tenon of a shape that complements the shape of the groove and of a height suited to that of the coil or bundle placed in the groove so as to fill the groove. A hot isostatic pressing step is then carried out during which the interstitial voids between the fibers become filled with the metal of the matrix. The metal filament sheaths weld together and weld to the walls of the groove by diffusion to form a dense entity made up of metal alloy within which the ceramic fibers extend. The entity obtained is machined so as to obtain the desired component incorporating the reinforcing fibers.

Variants include, in place of a groove, machining two shoulders in the main body to form a bearing surface for the insert. Once the insert has been positioned on the main body or the insert has been wound directly thereon, the groove and the entire container is reconstituted and its various components welded together prior to the hot isostatic pressing process.

In application FR 2,925,897 an insert is created by assembling a bundle of coated filaments and then incorporating that in a container with a metal powder. The container is evacuated and sealed with a lid prior to hot isostatic pressing. The powder technology allows the direct creation of components that have good dimensional accuracy, superior mechanical performance, and excellent metallurgical homogeneity. Furthermore, the geometry of the component derived from the method can be chosen so that it is as close as possible to the definitive component, requiring little or nothing by way of machining operation.

These examples of methods of manufacture have been given by way of illustration. They are not exhaustive.

The invention claimed is:

1. A beam for suspending a turboshaft engine from a structure of an aircraft, comprising:
a first attachment means to be fixed to the aircraft structure; and
second and third attachment means to be fixed to the engine,
wherein the beam is made at least in part of metal matrix composite incorporating reinforcing fibers,
wherein the beam is in a shape of an arc encompassing less than a full circle, the second and third attachment means are arranged at first and second ends of the beam, respectively, and
wherein the reinforcing fibers extend only between the second and third attachment means along the arc.

2. The beam as claimed in claim 1, wherein the first attachment means being formed between the second and third attachment means, in a middle of the beam.

3. The beam as claimed in claim 1, wherein the arc extends between 40° and 180°.

4. The beam as claimed in claim 1, wherein the second and third attachment means are devises.

5. The beam as claimed in claim 1, wherein the second attachment means is on standby.

6. An aircraft comprising a turboshaft engine and a beam for suspending the turboshaft engine as claimed in claim 1.

7. A beam for suspending a turboshaft engine from a structure of an aircraft, comprising:
a first attachment means to be fixed to the aircraft structure; and
a second attachment means to be fixed to the engine,
wherein the beam is made at least in part of metal matrix composite incorporating reinforcing fibers,
wherein the beam is in a shape of a ring, the ring configured to encircle the turboshaft engine,
wherein the reinforcing fibers of the ring-shaped beam are arranged in rings that are concentric with the ring-shaped beam, and
wherein a radial thickness of the beam is substantially uniform around the ring.

8. The beam as claimed in claim 7, wherein the second attachment means, formed of devises, is distributed about a periphery of the ring.

9. An aircraft comprising a turboshaft engine and a beam for suspending the turboshaft engine as claimed in claim 7.

10. A beam for suspending a turboshaft engine from a structure of an aircraft, comprising:
a mounting plate configured to accept fixing means, the mounting plate being in a form of a metal block with first attachment means for fixing to the structure of the aircraft on each side of the beam in a lengthwise direction; and
a second attachment means to be fixed to the engine,
wherein the beam is made at least in part of metal matrix composite incorporating reinforcing fibers, and
wherein the reinforcing fibers are straight and extend substantially parallel to the lengthwise direction of the beam through the mounting plate.

11. The beam as claimed in claim 10, wherein the mounting plate includes at least one clevis forming a second attachment means.

12. The beam as claimed in claim 10, wherein the fibers do not, within the beam, extend in line with one of the attachment means.

13. The beam as claimed in claim 10, wherein the mounting plate comprises the second attachment means including at least one connecting clevis with at least one orifice through which to pass a clevis pin.

14. The beam as claimed in claim 10, wherein the beam further comprises a lower mounting plate for fixing to the turboshaft engine, the mounting plate and the lower mounting plate being formed as single monolithic component.

15. An aircraft comprising a turboshaft engine and a beam for suspending the turboshaft engine as claimed in claim 10.

16. The beam as claimed in claim 10, wherein the first attachment means comprises orifices.

* * * * *